No. 805,640. PATENTED NOV. 28, 1905.
J. FILION.
CAR VESTIBULE DOOR AND TRAP.
APPLICATION FILED MAR. 31, 1905.

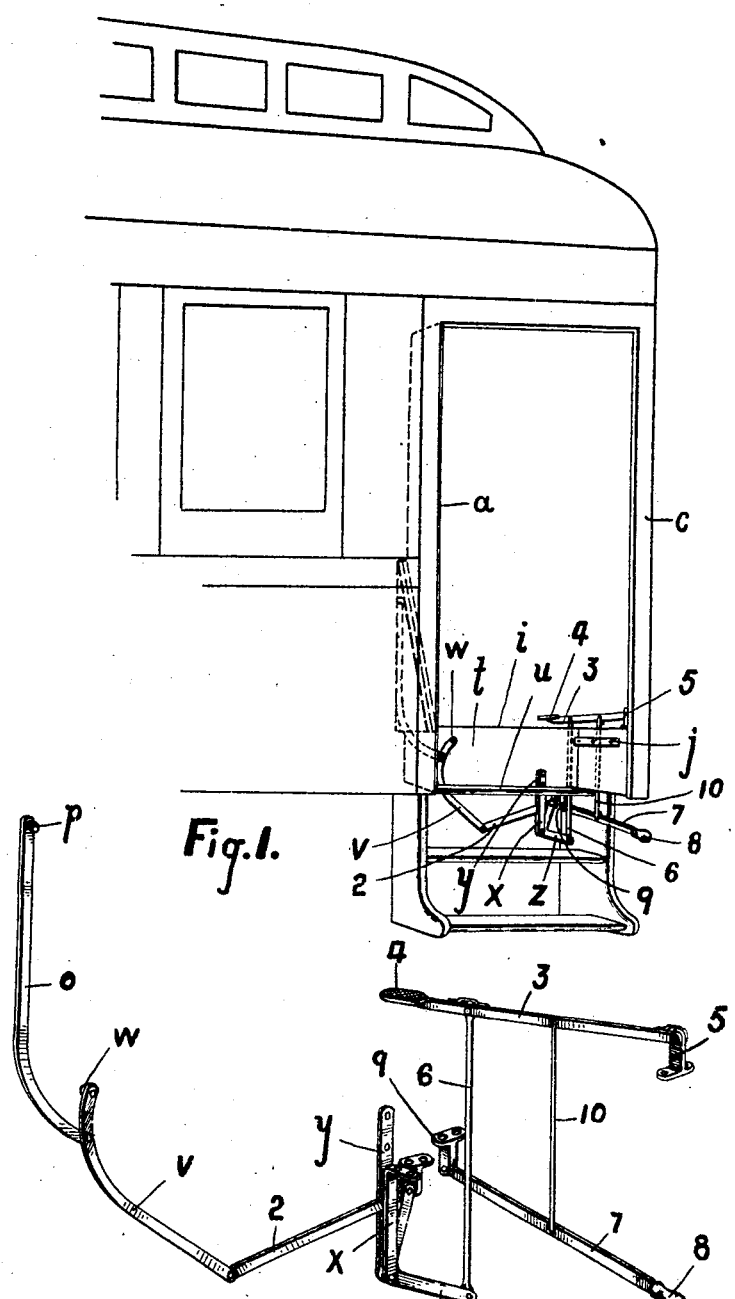

2 SHEETS—SHEET 2.

Witnesses.
Lloyd Blackmore
B. Herger

Inventor.
Joseph Filion
by E. J. Fetherstonhaugh Atty

UNITED STATES PATENT OFFICE.

JOSEPH FILION, OF MONTREAL, CANADA, ASSIGNOR, BY DIRECT AND MESNE ASSIGNMENTS, TO VOLKERT O. LAWRENCE, OF PHILADELPHIA, PENNSYLVANIA.

CAR-VESTIBULE DOOR AND TRAP.

No. 805,640.     Specification of Letters Patent.     Patented Nov. 28, 1905.

Application filed March 31, 1905. Serial No. 253,084.

*To all whom it may concern:*

Be it known that I, JOSEPH FILION, a subject of the King of Great Britain, residing at Montreal, in the district of Montreal, in the Province of Quebec, in the Dominion of Canada, have invented certain new and useful Improvements in Car-Vestibule Doors and Traps, of which the following is a specification.

My invention relates to improvements in car-vestibule doors and traps; and the object of the invention is to facilitate the opening of the vestibule-door either from the inside or the outside and coincidently open the trap and to generally change the construction shown and described in my United States Patent No. 776,507 to suit existing conditions on the railroads; and it consists, essentially, of a folding trap formed of two sections attached to the wall of the car and the door, respectively, and a plurality of levers pivotally secured independently of the trap and directly connected therewith, the various parts being described and arranged in detail, as hereinafter more particularly set forth.

Figure 3:
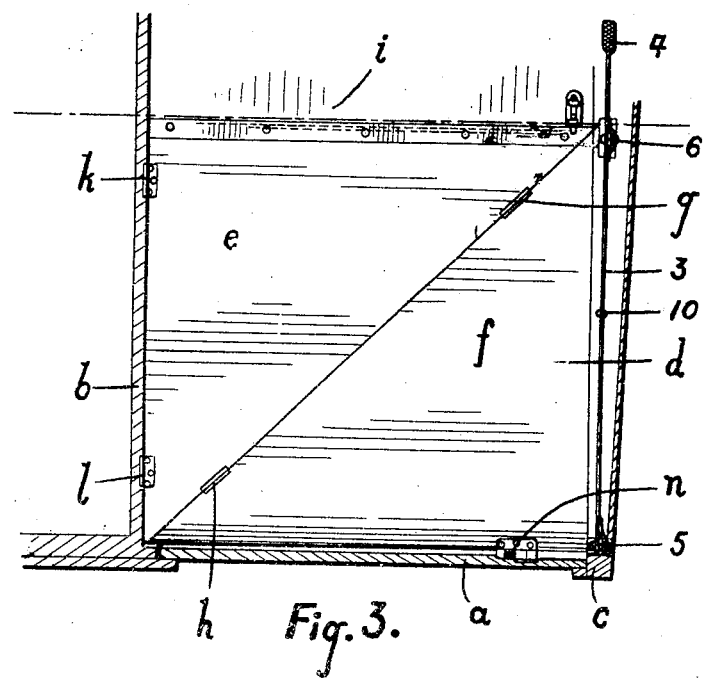
Figure 4:
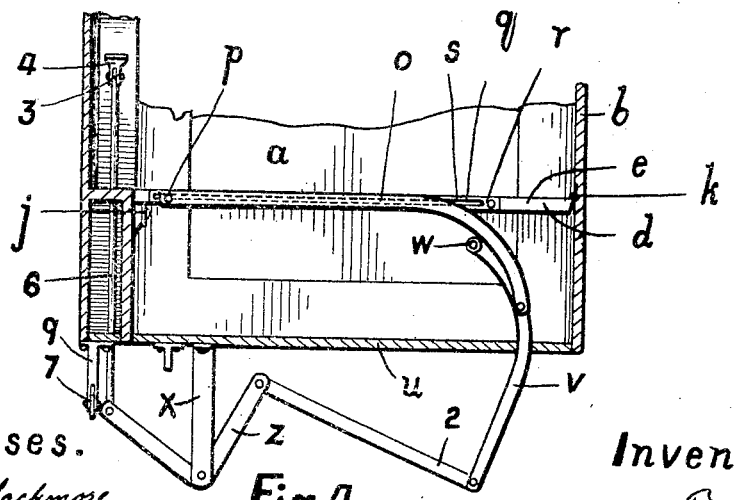

In the drawings, Figure 1 is a perspective view of a portion of a car, showing the vestibule-door open and the trap in dotted lines folded and the mechanism for opening the trap. Fig. 2 is an enlarged detail of the levers used for opening the trap. Fig. 3 is an enlarged view from above of the trap closed, showing the door and car-wall in section. Fig. 4 is an enlarged view showing the direct connection of the lifting mechanism with the trap and the door and car-wall in vertical section.

Lik characters of reference indicate corresponding parts in each figure.

$a$ is a vestibule-door hinged to and swinging inwardly against the end wall $b$ of the car and closing against the door-frame $c$.

$d$ is a trap diagonally split into the sections $e$ and $f$, hinged together at $g$ and $h$ and formed to fill in the space between the door $a$ and the platform $i$.

$j$ represents supports for the trap $d$, secured to the platform-frame.

The section $e$ is hinged at $k$ and $l$ to the side wall $b$ of the car and folds upwardly thereagainst on the opening of the door $a$. The section $f$ of the trap $d$, which must follow the section $e$ when the latter folds up to the wall $b$, is hinged at $n$ to the door in an adjustable manner, for the hinge must be so constructed as to permit its flanges to operate in different places on the pin to account for the various positions of the door in opening and shutting.

$o$ is a curved lever having the pin-head $p$ fixedly secured thereto at the extreme end of one of its sides. The said pin-head $p$ slides in a groove $q$, formed in one of the edges of the section $e$ of the trap, and the said groove $q$ is closed in by a plate $r$, which has a longitudinal slot $s$. The curved lever $o$ at its other end is pivotally secured to the face-board $t$, immediately above the step $u$.

$v$ is a curved lever pivotally secured intermediate of its length on the same point on the face-board $t$ as the lever $o$ and has journaled from its inner side at the extreme upper end thereof the roller $w$. The said roller is adapted to engage the edge of the lever $o$ and force it also to turn on its pivot.

$x$ is a bracket secured to the under side of the step $u$.

$y$ is a bracket secured at its upper end to the face-board $t$ and extending in a downward direction parallel to the bracket $x$.

$z$ is a bell-crank pivotally journaled at the lower ends of the brackets $x$ and $y$ and arranged so that one or other of the sections thereof in operation may pass between said brackets.

2 is a link in the chain of levers pivotally connecting the extremity of one section of the bell-crank to the lower end of the curved lever $v$.

It will be thus seen that any movement of the bell-crank immediately affects the position of the levers 2, $v$, and $o$, and thus changes the position of the pin-head $p$ in the groove $q$, which necessarily forces the trap upwardly, as will be explained more fully hereinafter.

3 is a foot-lever having the foot-tread 4 and pivoted at one end in the bracket 5, secured to the top of the frame of the platform.

6 is a connecting-rod between the foot-lever 3 and the bell-crank $z$ and pivotally secured to said foot-rod intermediate of the length thereof and to the extremity of the other section of the bell-crank lever $z$, so that any pressure on the tread 4 immediately affects the position of the bell-crank lever, and consequently the position of the trap.

7 is a lever having the handle 8 and pivoted at one end in the bracket 9, secured to the under side of the step $u$, and 10 is a connecting-rod pivotally attached to the foot-lever 3 and to the hand-lever 7 intermediate of their lengths, so that any movement of the said hand-lever in its pivotal bearing will correspondingly change the position of the foot-lever, the bell-crank lever, and the trap.

In the operation of this device the pressure on either the hand or the foot lever will open the trap, and consequently start the opening of the door. The pressure on the tread of the foot-lever forces downwardly one section of the crank-lever, which pulls on the lever $v$ through the connecting-link 2. The lever $v$ then turns on its pivot, and the roller at the end thereof engages the curved portion of the lever $o$. This causes the pin-head to slide in the groove $q$, and as the said pin-head slides and the lever $o$ is pivoted at a fixed point the trap must lift in order to accommodate the different position of the extremity of the lever $o$. The direction of travel of the pin-head in the groove is toward the corner of the trap, which rises in the folding thereof, and on the raising of the trap the door, if unlatched, may be readily opened and fold the trap up to the car-body.

The particular advantages of the construction herein described are the positive action of the chain of levers so arranged and the entire elimination of springs in the mechanism for opening, and in addition to this the simplification and cheapening in the cost of production. In railroad work it is well understood that the fewer parts there are to any device and the avoidance of complications will surely bring successful operation and durability.

What I claim as my invention is—

1. In a vestibule-car door and trap, the combination with the car-body, vestibule and platform, of a folding trap diagonally split into two sections attached to the wall of the car and the door respectively, one of said sections having a suitable guideway arranged therein, and a plurality of levers pivotally secured to the platform-frame and steps having one of said levers engaging said section in said guideway, as and for the purpose specified.

2. In a vestibule-car door and trap, the combination with the car-body, vestibule and platform, of a folding trap diagonally split into two sections attached to the car-body and the door respectively, one of said sections having a grooved guideway in the edge thereof, and a chain of levers pivotally connected together, operating from fixed pivotal points and having a projecting pin-head extending into said grooved guideway at one end and a means for operating at the other end, as and for the purpose specified.

3. In a vestibule-car door and trap, the combination with the car-body, vestibule and platform, of a folding trap diagonally split into two sections attached to the car body and door respectively, one of said sections having a grooved guideway in the edge thereof, and a plurality of levers, one of said levers having a pin-head projecting therefrom into said groove and a curved lower end pivoted beneath the trap, a second lever curved and pivoted intermediate of its length and having a roller at the upper end thereof engaging the first-named lever, and a bell-crank lever also pivoted beneath the steps and having pivotal connection with the second lever and an operating-lever at the other end, as and for the purpose specified.

4. In a vestibule-car door and trap, the combination with the car-body, vestibule and platform, of a folding trap diagonally split into two sections, one of said sections having a groove in the edge extending toward the corner to be elevated, and a plurality of levers pivotally connected, one of said levers having a projection extending into said groove and suitably held there and a curved lower end pivoted on a fixed point at its extremity below the trap, a lever having a curved upper end and projection therefrom, and pivoted on said fixed point intermediate of its length and engaging the aforesaid lever, a bell-crank lever pivoted from brackets extending downwardly from the steps having one section thereof pivotally connected by a rod to the second-named curved lever, and a foot-lever pivoted in a bracket on the platform and connected by a suitable rod to the other section of said bell-crank, as and for the purpose specified.

5. In a vestibule-car door and trap, the combination with the car-body, vestibule and platform, of a folding trap diagonally split into two sections, one of said sections having a groove in the edge extending toward the corner to be elevated, and a plurality of levers pivotally connected, one of said levers having a projection extending into said groove and suitably held there and a curved lower end pivoted on a fixed point at its extremity below the trap, a lever having a curved upper end and projection therefrom, and pivoted on said fixed point intermediate of its length and engaging the aforesaid lever, a bell-crank lever pivoted from brackets extending downwardly from the steps having one section thereof pivotally connected by a rod to the second-named curved lever, and a foot-lever pivoted in a bracket on the platform and connected by a suitable rod to the other section of said bell-crank, and a hand-lever pivoted in a bracket secured under the step, and having connection with said foot-lever, as and the purpose specified.

Signed at Montreal, in the district of Montreal, in the Province of Quebec, in the Dominion of Canada, this 25th day of March, 1905.

JOSEPH FILION.

Witnesses:
   LLOYD BLACKMORE,
   G. H. TRESIDDER.